June 15, 1948.                A. HELGASON                2,443,536
                    MOUNTING MEANS FOR ELECTRICAL DEVICES
                            Filed March 6, 1946
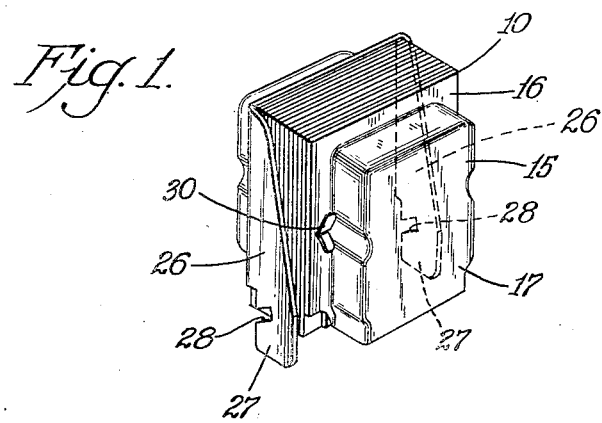
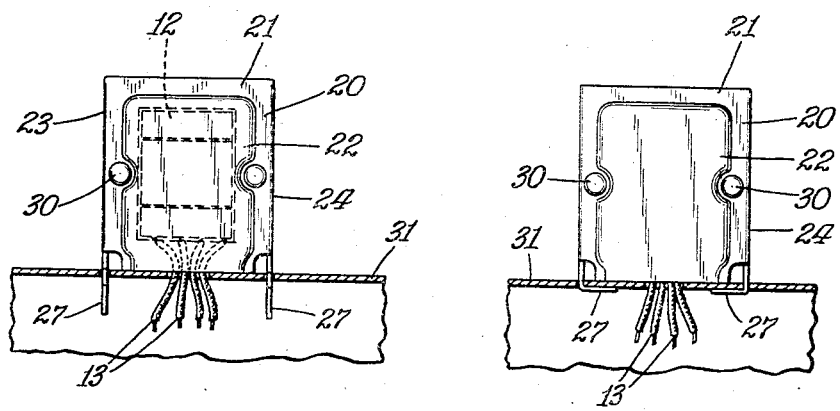
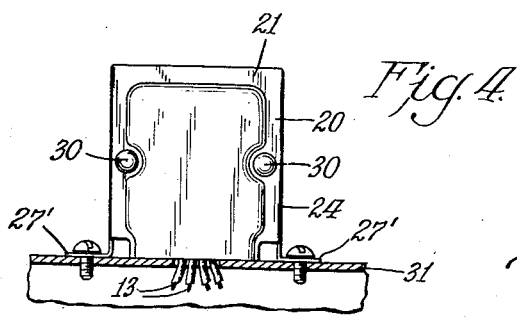
Inventor:
Arni Helgason
By Robert L Kahn
            Attorney Patented June 15, 1948

2,443,536

UNITED STATES PATENT OFFICE 2,443,536

MOUNTING MEANS FOR ELECTRICAL DEVICES

Arni Helgason, Wilmette, Ill., assignor to Essex Wire Corporation, Detroit, Mich., a corporation of Michigan Application March 6, 1946, Serial No. 652,317

1 Claim. (Cl. 175—356)

This invention relates to an electrical apparatus and particularly to small transformers, reactors, chokes and the like. Small transformers and similar devices for low power applications are customarily provided with means for mounting the same on a base or chassis as in the case of radio receivers.

The invention hereinafter described provides a simple and effective mounting construction for transformers and the like whereby such transformers may be secured in position on a base quickly and effectively without special tools. In addition, the invention provides a simple transformer bell having means integral therewith for mounting the transformer upon a base. A construction embodying the invention is desirable in that simple dies for fabricating the bells may be used. The assembly of a complete transformer with bells embodying the present invention is simple and may be accomplished with a minimum of time and effort. The same bells may be used with various core thicknesses.

While the invention is susceptible to various modifications, one embodiment thereof is shown in the drawings wherein Figure 1 shows an isometric view of a transformer provided with bells embodying the present invention. Figure 2 shows the transformer of Figure 1 disposed in position upon a baseboard prior to locking. Figure 3 shows the transformer locked in position. Figure 4 shows a modified construction.

The transformer in general comprises a stack of laminations 10 of any shape, said laminations having suitable windings 12 with leads 13. The transformer stack and windings may be any one of a number of different types all well known in the art.

Disposed against one face of stack 10 is end bell 15 of pressed or drawn sheet metal. This bell is of the usual construction having a rim portion 16 around three sides and central portion 17 drawn out of the plane of rim 16 to accommodate windings.

The remaining face of stack 10 is provided with bell 20 having rim 21 around the three sides thereof corresponding to rim 16 and having central bell portion 22 corresponding to bell 17. Flat rim 21 of bell 20 has opposing edges 23 and 24 bent to form retaining strips 26. Retaining strips 26 may be shaped as desired and preferably have tongue portions 27 extending below stack 10. It is evident from Figure 1 that the bottom of stack 10 is that portion of the stack which does not have rim portions 16 and 21 on the end bells.

As shown here, strips 26 are narrow at the top of the transformer and taper to full width near the bottom of the transformer. Notches 28 may be cut in strips 26 at the place where bending is to be effected.

The two bells and stack may be maintained in assembled relation by suitable means passing through aligned apertures in the bells and laminations. Thus, as shown, rivets 30 may be threaded through the aligned apertures to maintain the assembly intact. Other means, such as bolts, eyelets or the like, may be provided.

The entire transformer may be mounted on base 31 by threading tongues 27 through suitable apertures provided in base 31. When the transformer is in position, tongues 27 may be bent against base 31 to lock the transformer in place. Notches 28 make it possible to hold the transformer in position by twisting the tongues instead of bending them against a mounting plate.

Referring to Figure 4, a modified bell structure is shown wherein conventional apertured mounting lugs 27' are provided. Thus, the transformer may be handled like any other transformer.

It is evident that, instead of one bell having strips 26 on opposite sides thereof, one strip may be on one bell, and the other strip may be disposed on the other bell. In that way, a single set of dies may be used for shaping the bells for a transformer.

By virtue of the above construction, the transformer stack and bells are maintained intact and not disturbed during the mounting of the transformer on a base.

What is claimed is:

A transformer comprising a stack of laminations and windings, the stack of laminations being coextensive on the top and bottom as well as on the opposite sides thereof, said stack having two faces in planes parallel to the planes of the laminations and beyond which faces the windings normally extend, an end bell for said transformer at each face, each bell having a portion adapted to rest against a portion of the stack face, one of said bells having at least one lateral projection adapted to lie along one of the sides of the stack so that both bells together embody lateral projections adapted to embrace at least part of the opposite sides of the stack, said projections normally extending perpendicular to a transformer mounting surface, said projections having integral mounting lugs extending beyond the bottom of the transformer, said windings having leads extending beyond the bottom of the transformer, and said lugs functioning as a supporting means for retaining the transformer in position on a mounting surface plate by the penetration of said lugs through apertures in the mounting plate for subsequent distortion, and said mounting plate having in addition an opening for receiving said leads therethrough.

ARNI HELGASON.

REFERENCES CITED

The following references are of record in the file of this patent:

UNITED STATES PATENTS

| Number | Name | Date |
|---|---|---|
| 1,603,832 | Bohlman et al. | Oct. 19, 1926 |
| 1,666,889 | Deslodge | Apr. 24, 1928 |

FOREIGN PATENTS

| Number | Country | Date |
|---|---|---|
| 205,013 | Great Britain | Oct. 11, 1923 |